May 21, 1929.                    E. BELIN                    1,714,154
                    RADIOVISION AND TELECINEMATOGRAPHY
                           Filed Dec. 11, 1925
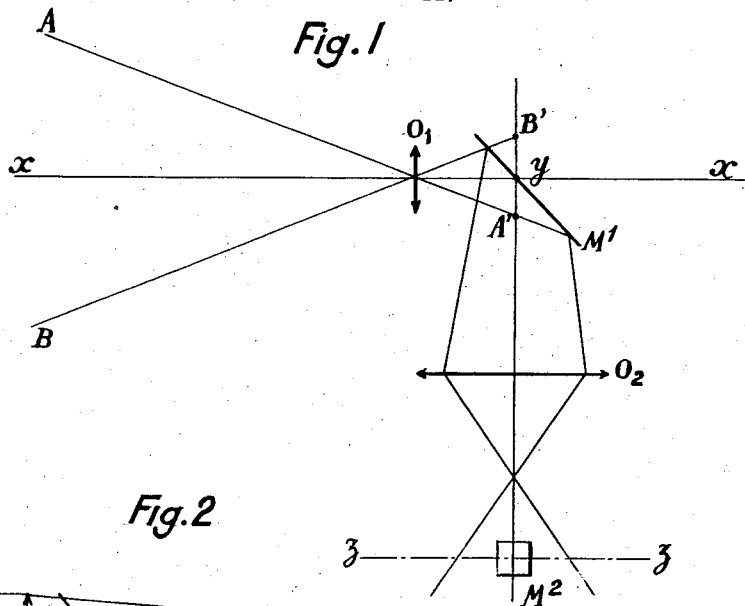
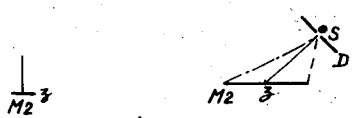
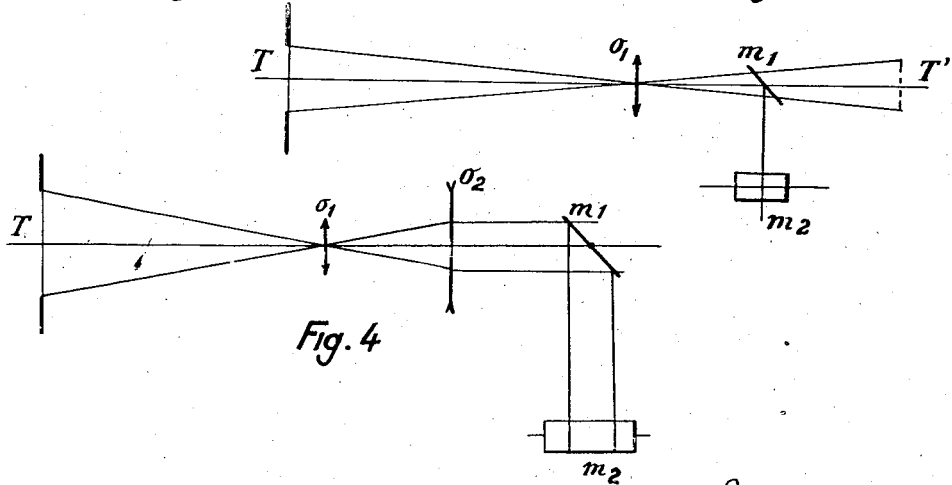

Patented May 21, 1929.

1,714,154

UNITED STATES PATENT OFFICE.

EDOUARD BELIN, OF PARIS, FRANCE.

RADIOVISION AND TELECINEMATOGRAPHY.

Application filed December 11, 1925, Serial No. 74,879, and in France December 16, 1924.

In specification of U. S. Patent No. 1,670,795, May 22, 1928, a process of television was described. This invention relates to a more nearly defined method and apparatus. In order to shorten the description the invention will be described with reference to said specification.

When transmitting a station takes the place of an eye and will be called the "seeing" station. It produces, by means described in the said specification, a real optical image of the object or landscape seen. By two mirrors at right angles, one of which is very small and oscillates at high speed and the other of which is larger and oscillates much more slowly, a photo-sensitive element is swept over by all points of the real optical image in succecssive lines.

This simple exploration as described in the preceding specification although sufficient in some cases, cannot be considered as entirely satisfactory as the real optical image is not constituted in a plane when the seeing station is directed on a landscape where successive planes come into consideration.

Fig. 1 is a diagrammatic plan view of the invention;

Fig. 2 is a diagrammatic plan view of the invention showing the beams as they are reflected onto the photosensitive elements; and Figs. 3 and 4 are diagrammatic plan views of modified forms of the invention.

In order to produce an optical image in one plane, a lens arrangement shown in Figure 1 is employed.

The lens $O_1$ of very short focal length and having as large an aperture as possible gives at $A_1$, $B_1$ close to its rear face a very bright and very small image of the object A, B. In the plane of this image is the axis $y$ of oscillation of the low-speed mirror $M_1$. The reflected beam is immediately received by the second lens $O_2$ of greater focal length than the lens $O_1$ preferably a microscopic lens.

As the mirror $M_1$ oscillates about its axis, Y, it will reflect all the diverging rays of successive vertical lines on the picture to the mirror $M_2$. By converging their beams it will suffice to place a mirror $M_2$ (of high speed) having an axis $z$—$z$ perpendicular to the plane in question for satisfactory conditions to be obtained and will suffice however small it may be to transmit all the rays reflected by mirror $M_1$ onto a photo-sensitive element situated in the plane of the axis $y$ and of the system $O_2$.

This photo-sensitive element will therefore be explored by the whole of the real optical image and under identical conditions whatever may be the rays in question.

With a system $O^2$ formed as a compound microscope, the emergent beam will have its point of convergence very near the mirror $M_2$ which may also be of small dimensions.

The mirrors $M_1$, $M_2$ may of course be inverted.

An arrangement of this type has been made in which the larger mirror to which only relatively slow displacements may be given is situated in rear of sighting lens. When so placed it intercepts all the emergent rays which is not possible with a very small mirror which has to move at great speeds. In the new arangement however the quickly moving mirror can be made of dimensions so small as to be displaceable by mechanical means.

Referring to Figure 2, two mirrors $M_1$, $M_2$ having mutually perpendicular axes $y$—$z$ situated in parallel planes are used. Mirror $M_1$ is situated in rear of the lens $O_1$ and intercepts the emergent beam near to this lens $\omega$ being the point at which the image would otherwise be formed. The mirror $M_1$ which oscillates about the axis $y$ will cause mirror $M_2$ to be swept by the beam. This sweeping action will take place slowly for example 10–16 times per second.

During each sweep, the mirror $M_2$ which oscillates about its axis $z$ will reflect the beam portion reflected by $M_1$ which intersects it momentarily, so that during one oscillation of mirror $M_2$ the whole of this portion will pass over the hole in a diaphragm D behind which is a photo-sensitive element S.

The distance of S from the axis of mirror $M_2$ is such that the sum $yz + zS = M_1\omega$; the image at S will therefore be as clear as it was at $\omega$.

If therefore $M_1$ occupies a number of successive positions during 1/2 oscillations of $M_2$ sufficient to cover the width of $M_2$ (which should be sufficient to embrace the reflected beam), the whole emergent beam will have been explored by the element S. In practice these movements are continuous and explorations takes place by a sort of sinuosity and not by regularly spaced straight lines.

It will be understood however that this width of mirror $M^2$ is very small, thus the mass of the mirror is very small; owing to this arrangement both mirrors $M_2$ and $M_1$ can be driven mechanically in spite of the fact that the speed of mirror $M_2$ is high.

For the oscillating control of one of the analyzer mirrors at the transmission end there may therefore be substituted a mechanical drive which will evidently consitute a simplification.

As in the former specification a photosensitive element whose resistance varies continuously may be employed for imposing in a radio-electric emission of any system, differences of intensity, which so as not to be produced in the oscillating form (vibratory or periodical) necessitated by the vibrations of a microphone (for in this case there is no vibrating element) produce variation effects capable of being quickly received on arrival. It is clear that any amplifying means may moreover be interposed between this element and the emission.

The receiving station should produce or project the image under the eye of a spectator; this will be called the "projecting station". It must of course comprise:

1. Suitable receiving means, for collecting the emissions of the transmitting system controlled by the seeing post; nothing need be specified as regards this receiving station.

2. A system capable of translating the variations of emissions collected into variations of luminous intensities and this must take place in accord with the variations of luminous intensity of the object.

3. Distributing means which correspond to the exploration means for transmission, and 4. A projector means which ensure the visibility upon a screen according to the local necessities for one or a number of spectators.

In the prior specification there were described means for translating variations of the waves received into variations of luminous intensity by interposing a colour range (T in Figures 3–4) of that specification. The possible use of phenomena of another order, such as a neon lamp or the Kerr phenomena which is an example of rotary electric polarization was also therein proposed.

These phenomena are made use of in the arrangement described in this specification but it should be understood that this is by way of illustration only; all other similar phenomena may be employed.

It is known that this phenomenon only makes use of variations of tension and these variations are applied at the terminals of a condenser whose dielectric, when it is liquid, produced electric rotary polarization effects which may be considered as instantaneous (of the order $4 \times 10-8$ seconds according to MM. Abraham et Lemoine) upon an analyzed luminous beam passing through it.

But, by interposing between the receiver and the amplifying system comprising a suitable number of stages, tensions as high as desired may be applied at the last plate to produce rotary electric polarization at a suitable point. This tension which is raised but modulated, will therefore be applied directly or otherwise to the terminals of the Kerr condenser; a very powerful and constant luminous beam passing through the analyzer to start with will become more or less obscured by polarization; the rectifier can only reconstitute a light more or less attenuated.

The condenser will finally impose on the beam graduated properties which are a function of the variations of resistance of the photo-sensitive element at the transmission and therefore a function of the illuminated object sighted by the seeing station.

The beam thus obscured may, by any suitable form of condenser, give a stationary circular spot of variable brilliancy.

It is this beam which will be subjected to a distribution similar to the exploration at the seeing post.

If the spot T be considered as the object A. B. sighted at the seeing station the same optical means (Figure 3) is employed i. e. lens $O_1$ giving a real optical image sent by the mirrors $m_1$ (slower) and $m_2$ (rapid) turning about a mutually perpendicular axes. Figure 4 shows an arrangement which is more spaced owing to the divergent lens $o_2$.

Finally and for fairly rapid movement of mirrors $m_1$, $m_2$, an image will appear on the screen made up of successive lines of projection of the beam emanating from the spot T and which image is illuminated correspondingly with points of the object sighted at the seeing station.

The projection of this image on the large screen may be effected in several ways:

(a) Merely by using a lens $O_1$ of sufficiently large focal distance without the lens $O_2$;

(b) By adjusting the distances $O_1$, $O_2$ for bringing to a focus a suitably sized image of T.

(c) By forming an aerial image which will be projected by a lens of short focal length and of large aperture.

The establishment of sighting and projecting stations will be easily understood while reconstitution of the image for projection does not offer any difficulty provided mirrors $M_1$ $M_2$ and $m_1$, $m_2$ move in rigourous synchronism so that the reconstitution will only be the repetition of the exploration. It is moreover clear that no means of displacement comprising a mechanical member can probably give satisfaction and control movements of the required rapidity.

Synchronization, however, can be obtained in the following simple manner:

The two low speed mirrors $M_1$, $m_1$ are formed as vibratory or oscillograph galvanometer mirrors; one oscillation produced at the sighting station, of a wave length different from that modulated by the photo-sensitive element is there manipulated. This oscillation will be received by a suitable means both at the transmitting and receiving station and will simultaneously control, in rigorous synchronism, the mirrors $M_1$, $m_1$. The mirrors will be thus displaced to the maximum, they will return by reverse effect with identical and simultaneous movements which may be rendered continuous and uniform in any suitable manner.

It may only be necessary for the control of these movements to employ mechanical means which are as regular and similar as possible; as reception is effected with a projection which is always visible, it will be easy and simple so to regulate, at the moment itself, the speed of the means which controls the mirror $M_2$ that the image projected may remain correct without there being any need of a connection between the two stations for this purpose.

Synchronous motors, clock mechanism, counter Guiller chronometers, etc., are very suitable for use.

Whereas in Figure 2, there is no oscillograph at the transmission end, the rapid receiving mirror is adjusted by a wave emitted at the transmitting station; by the word "adjusted" must be understood the equivalent to the control of the transmitting telegraphic type, or a contact disk circuit breaker or alternator.

It will be understood from the foregoing that the details may vary; the invention however is characterized by the features:

*I. At the seeing station.*

1. Production of a real optical image of the object seen.
2. Exploration of the image by a photo-sensitive element following lines, combined with a movement of mirrors.
3. Modulation by the photo-sensitive element of a radio electric emission.
4. Emission of another radio electric modulation, manipulated for controlling the rapidly exploring mirror.
5. The mechanically controlled low speed exploring mirror.

*II. At the projection station.*

1. Reception of modulated waves.
2. Application of variations of tension adjusted by the modulation for the production of the phenomenon of electric rotary polarization for obscuring a luminous beam in accordance with the modulation.
3. Distribution of the colored beam by lines thrown upon the screen by the action of mirrors similar to those at the seeing station.
4. Finally, taking up this beam by a powerful projecting means.
5. Receiving the manipulated wave for the control of the quick moving distribution mirror.
6. Mechanically controlled slowly moving distribution mirror whether directly or indirectly placed in accord with the mirror at the seeing station.

The formation at the receiving station of a real optical image further allows the image to be collected on a film destined for projection; it is only necessary for this purpose that the movements of displacement of the receiving film should be co-ordinated with those of the distributing and exploring mirrors in order that one image may be exchanged for the image following without confusion.

This co-ordination takes place as can easily be understood owing to the manipulation which adjusts the mirrors at a high speed and owing to the mechanism which turns the mirrors at a low speed.

Telecinematography without wires can therefore be effected.

This operation moreover allows the direct cinematography of the moving projection of moving images produced at the projecting station. In both cases there will be instantaneously and at any distance, the cinematographic film of the movements sighted at the seeing station, and this is the second object of the present invention.

Having now particularly described and ascertained the nature of my said invention and in what manner the same is to be performed, I declare that what I claim is:

1. In an electrical image transmitting apparatus, means including an objective of short focal length for projecting a luminous image beam, a photosensitive means of a character for impressing modulations upon a carrier wave, two scanning mirrors oscillating in planes mutually perpendicular to each other for scanning the beam and impressing the resultant luminous points upon the photosensitive means, one of said mirrors being placed close to and behind the objective so as to intercept and act upon the beam at a point materially short of its full focal point, and a second objective of greater focal length than the first objective disposed in the path of the deflected beam between the first and second mirror.

2. In an electrical image transmitting apparatus, means including an objective of short focal length for projecting a luminous image beam, a photosensitive means of a character for impressing modulations upon a carrier wave, two scanning mirrors oscillating in planes mutually perpendicular to each other for scanning the beam and impressing the resultant luminous points upon the photosensitive means, one of said mirrors being positioned close to and directly behind the objective so as to intercept and act upon the beam at a point short of its full focal point, said mirror being of comparatively large dimensions and oscillating at comparatively low speed, and the other of said mirrors being of relatively smaller superficial dimensions and oscillating at a relatively higher speed, and a second objective of greater focal length than the first-named objective and disposed in the path of the beam between the first and second-named mirror.

3. In an electrical image transmitting apparatus, means including an objective of short focal length for projecting a true image beam, a photosensitive means of a character for impressing modulations upon a carrier wave, two scanning mirrors oscillating at relatively high and low speeds in planes mutually perpendicular to each other for scanning the beam and impressing the resultant luminous points upon the photosensitive means, one of said mirrors being placed close to and behind the objective so as to intercept and act upon the beam at a point materially short of its full focal point, and a second objective comprising a compound microscope disposed in the path of the reflected beam between the first and second mirror.

In testimony whereof I affix my signature.

EDOUARD BELIN.